US008703885B2

(12) United States Patent
Dewachter et al.

(10) Patent No.: US 8,703,885 B2
(45) Date of Patent: Apr. 22, 2014

(54) METHOD FOR PRODUCING A CATALYST SLURRY BLEND

(75) Inventors: Daan Dewachter, Mechelen (BE); Martine Slawinski, Nivelles (BE)

(73) Assignee: Total Research & Technology Feluy, Senefee, (Feluy) (BE)

( * ) Notice: Subject to any disclaimer, the term of this patent is extended or adjusted under 35 U.S.C. 154(b) by 0 days.

(21) Appl. No.: 13/514,344

(22) PCT Filed: Dec. 17, 2010

(86) PCT No.: PCT/EP2010/070052
§ 371 (c)(1),
(2), (4) Date: Jun. 7, 2012

(87) PCT Pub. No.: WO2011/073380
PCT Pub. Date: Jun. 23, 2011

(65) Prior Publication Data
US 2012/0264891 A1    Oct. 18, 2012

(30) Foreign Application Priority Data
Dec. 18, 2009 (EP) .................................. 09179862

(51) Int. Cl.
*C08F 2/12* (2006.01)
*C08F 2/38* (2006.01)
*C08F 10/02* (2006.01)

(52) U.S. Cl.
USPC .............................. 526/64; 526/905; 526/919

(58) Field of Classification Search
USPC ...................... 526/64, 919, 65, 905
See application file for complete search history.

(56) References Cited

U.S. PATENT DOCUMENTS

| 2008/0039596 A1 | 2/2008 | Fouarge | |
|---|---|---|---|
| 2008/0132656 A1* | 6/2008 | Lee et al. | ......................... 526/64 |

FOREIGN PATENT DOCUMENTS

| EP | 1563902 A1 | 8/2005 |
|---|---|---|
| WO | WO 2005/077522 A1 * | 8/2005 |

* cited by examiner

*Primary Examiner* — Fred M Teskin

(57) ABSTRACT

The present invention relates to a method for producing a catalyst slurry blend suitable for polymerizing ethylene in an ethylene polymerization loop reactor for obtaining an at least trimodal polyethylene product, comprising the steps of:
transferring a first ethylene polymerization catalyst at a first mass flow rate to a mixing vessel,
simultaneously transferring a second ethylene polymerization catalyst at a second mass flow rate to said mixing vessel, thereby in situ providing a catalyst slurry blend, wherein said second ethylene polymerization catalyst is different from the first ethylene polymerization catalyst,
adjusting and monitoring said first and second mass flow rates, thereby obtaining said catalyst slurry blend at a concentration suitable for polymerizing ethylene, and
feeding said catalyst slurry blend to an ethylene polymerization double loop reactor producing said at least trimodal polyethylene product.

19 Claims, 2 Drawing Sheets

METHOD FOR PRODUCING A CATALYST SLURRY BLEND

CROSS-REFERENCE TO RELATED APPLICATIONS

This application claims the benefit of PCT/EP2010/070052, filed Dec. 17, 2010, which claims priority from EP 09179862.9, filed Dec. 18, 2009.

FIELD OF THE INVENTION

The present invention relates to a method for preparing a blend of catalysts in the form of slurry for feeding a polymerization reactor. This invention can advantageously be used in chemical manufacturing, specifically in the production of polyethylene.

BACKGROUND OF THE INVENTION

Polyethylene (PE) is synthesized by polymerizing ethylene ($CH_2=CH_2$) monomers. Because it is cheap, safe, stable to most environments and easy to be processed polyethylene polymers are useful in many applications. According to the properties polyethylene can be classified into several types, such as but not limited to LDPE (Low Density Polyethylene), LLDPE (Linear Low Density Polyethylene), and HDPE (High Density Polyethylene). Each type of polyethylene has different properties and characteristics.

Ethylene polymerizations are frequently carried out in a loop reactor using ethylene monomer, liquid diluent and catalyst, optionally one or more co-monomer(s), and hydrogen. The polymerization in a loop reactor is usually performed under slurry conditions, with the produced polymer usually in a form of solid particles which are suspended in the diluent. The slurry in the reactor is circulated continuously with a pump to maintain efficient suspension of the polymer solid particles in the liquid diluent. Polymer slurry is discharged from the loop reactor by means of settling legs, which operate on a batch principle to recover the slurry. Settling in the legs is used to increase the solids concentration of the slurry finally recovered as product slurry. The product slurry is further discharged through heated flash lines to a flash vessel, where most of the diluent and unreacted monomers are flashed off and recycled.

Alternatively, the product slurry may be fed to a second loop reactor serially connected to the first loop reactor wherein a second polymer fraction may be produced. Typically, when two reactors in series are employed in this manner, the resultant polymer product is a bimodal polymer product, which comprises a first polymer fraction produced in the first reactor and a second polymer fraction produced in the second reactor, and has a bimodal molecular weight distribution.

After the polymer product is collected from the reactor and the hydrocarbon residues are removed, the polymer product is dried, additives can be added and finally the polymer may be extruded and pelletized.

During the extrusion process ingredients including polymer product, optional additives, etc, are mixed intimately in order to obtain a compound as homogeneous as possible. Usually, this mixing is done in an extruder wherein the ingredients are mixed together and the polymer product and optionally some of the additives are melted so that intimate mixing can occur. The melt is then extruded into a rod, cooled and granulated, e.g. to form pellets. In this form the resulting compound can then be used for the manufacturing of different objects.

Polymerization of ethylene involves the polymerization of ethylene monomer in the reactor in the presence of a polymerization catalyst and optionally, if required depending on the used catalyst, an activating agent. Suitable catalysts for the preparation of polyethylene comprise chromium catalysts, Ziegler-Natta catalysts and metallocene catalysts. Typically, the catalyst is used in particulate form. The polyethylene is produced as a resin/powder with a hard catalyst particle at the core of each grain of the powder.

Several systems have been disclosed which involve the preparation and the supply of catalyst slurry to a polymerization reaction. In general, for preparing catalyst slurry, a mixture of dry solid particulate catalyst and diluent are apportioned in a catalyst mixing vessel and thoroughly mixed. Then such catalyst slurry is typically transferred to a polymerization reactor for contact with the monomer reactants, generally under high pressure conditions.

It is known in the art that for the production of ethylene polymers having suitable properties it is important to select the appropriate catalysts. It is thereby required to use the capacity of a production installation efficiently, hence to reduce time required for catalyst preparations and catalyst changes to a minimum. Inadequate catalyst replacements may result in disturbances of a polymerization reactor's steady state regime, long transition periods, production of transition material unsuitable for further use, for instance in an application.

In view of the above, there remains a need in the art for optimizing catalyst preparation procedures. The present invention aims to provide a method allowing that a catalyst preparation process for preparing multimodal polyethylene product can be improved further.

SUMMARY OF THE INVENTION

The present invention relates to a method for optimizing catalyst preparation, as provided by claim 1.

The present invention provides a method for producing a catalyst slurry blend suitable for polymerizing ethylene in an ethylene polymerization loop reactor for obtaining a multimodal polyethylene product, comprising the steps of:
  transferring a first ethylene polymerization catalyst at a first mass flow rate to a mixing vessel,
  simultaneously transferring a second ethylene polymerization catalyst at a second mass flow rate to said mixing vessel, thereby in situ providing a catalyst slurry blend,
  adjusting and monitoring said first and second mass flow rates, thereby obtaining said catalyst slurry blend at a concentration suitable for polymerizing ethylene,
  feeding said catalyst slurry blend to an ethylene polymerization loop reactor producing said multimodal polyethylene product.

In particular the present invention provides a method for producing a catalyst slurry blend suitable for polymerizing ethylene in an ethylene polymerization loop reactor for obtaining an at least trimodal polyethylene product, comprising the steps of:
  transferring a first ethylene polymerization catalyst at a first mass flow rate to a mixing vessel,
  simultaneously transferring a second ethylene polymerization catalyst at a second mass flow rate to said mixing vessel, thereby in situ providing a catalyst slurry blend, wherein said second ethylene polymerization catalyst is different from the first ethylene polymerization catalyst, adjusting and monitoring said first and second mass flow rates, thereby obtaining said catalyst slurry blend at a concentration suitable for polymerizing ethylene, and feeding said catalyst slurry blend to an ethylene polymerization double loop reactor producing said at least trimodal polyethylene product.

The above provided method allows the preparation of a catalyst slurry blend in an efficient, hence economical way. Time required for the preparation of a new blend and transitioning between blends may be kept minimal. The method allows transitioning from one type of catalyst to another in the production of ethylene multimodal polyethylene products having different properties and characteristics as obtained using another catalyst system to be produced using the same equipment.

Optimization of the catalyst feed to an ethylene polymerization reactor allows the down-time of the reactor and transition time to another catalyst blend to be kept to a minimum. This is advantageous for reducing the loss of production time and reducing the amount of transition product produced. As the transition product is waste material, it is of economical interest to keep it to a minimum, even to avoid it.

These and further aspects and embodiments of the invention are further explained in the following sections and in the claims, as well as illustrated by non-limiting examples.

DETAILED DESCRIPTION OF THE INVENTION

Figure 1:
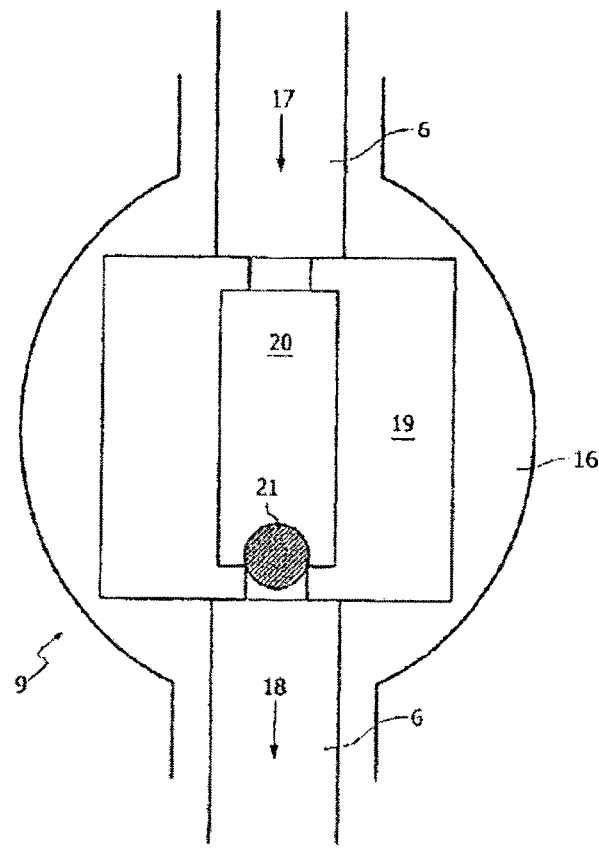
FIG. 1 is a detailed representation of a preferred embodiment of a metering valve, used in the apparatus according to the present invention for controlling the transfer of catalyst slurry from a mud pot to a mixing vessel.

Before the present method used in the invention is described, it is to be understood that this invention is not limited to particular methods, components, or devices described, as such methods, components, and devices may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps.

The terms "comprising", "comprises" and "comprised of" also include the term "consisting of".

The recitation of numerical ranges by endpoints includes all numbers and fractions subsumed within the respective ranges, as well as the recited endpoints.

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

All documents cited in the present specification are hereby incorporated by reference in their entirety.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

The present invention relates to a novel method for producing catalyst slurry blends for the production of multi-modal polyethylenes.

As used herein, the term "blend" it is meant a uniform mixture.

As used herein, the term "slurry" refers to a composition comprising catalyst solid particles and a diluent. The solid particles can be suspended in the diluent, either spontaneously or by homogenization techniques, such as mixing. The solid particles can be inhomogeneously distributed in a diluent and form a sediment or deposit. In the present invention it is especially applicable to solid particles of ethylene polymerization catalyst in a liquid diluent. These slurries will be referred to as ethylene polymerization catalyst slurries.

By the term "solid particles" it is meant a solid provided as a collection of particles, such as for instance a powder or granulate. In the present invention it is especially applicable to a catalyst provided on a carrier or support. The support is preferably a silica (Si) support.

As used herein, the "catalyst" refers to a substance that causes a change in the rate of a polymerization reaction without itself being consumed in the reaction. In the present invention it is especially applicable to catalysts suitable for the polymerization of ethylene to polyethylene. These catalysts will be referred to as "ethylene polymerization catalysts".

Examples of ethylene polymerization catalysts are metallocene catalysts, chromium catalysts and metallocene with Ziegler-Natta catalysts. Preferred blends are moderately flowing or free flowing, preferably free flowing.

In a preferred embodiment of this invention, the ethylene polymerization catalyst is a free flowing catalyst. As used herein, the term "free flowing ethylene polymerization catalyst" refers to an ethylene polymerization catalyst which in its substantially dry state has an angle of repose below 40 degrees, more preferably below 50 degrees, most preferably below 60 degrees. Examples of free flowing catalysts are catalysts provided on a carrier, such as a silica carrier.

By the term "angle of repose" as used herein, it is meant the maximum angle measured in degrees at which a pile of substantially dry solid catalyst particles retains its slope. The angle of repose may be measured for instance by allowing a quantity of substantially dry solid catalyst particles to form a heap. Slippage of the particles will occur so that a sloping surface is exhibited. The angle of the free surface depends principally upon the nature of the bulks solid used. This angle is reasonably consistent for a given bulk solid and is defined as the "angle of repose". The angle of repose of a bulk solid such as a solid catalyst provides an indication of its flow behaviour as follows, according to Bulk Solids Handling, p31:

| Angle of repose | Flow behaviour |
| --- | --- |
| 25-30 degrees | Very free flowing |
| 30-38 degrees | Free flowing |
| 38-45 degrees | Fair flowing |
| 45-55 degrees | Cohesive |
| >55 degrees | Very cohesive |

Ethylene polymerization catalysts with the above described angle of repose spontaneously formed a substantially horizontal interface when mixed with a diluent and allowed to sediment. This is advantageous for the monitoring of their level in a mud pot using reflectometry. It allows accurate and reliable readings of the level of polymerization catalyst slurry.

Use of a free flowing ethylene polymerization catalyst is advantageous to obtain a free flowing ethylene polymerization catalyst slurry. This facilitates pumping and metering of the slurry and hence catalyst dosing.

The term "metallocene catalyst" is used herein to describe any transition metal complexes consisting of metal atoms bonded to one or more ligands. The metallocene catalysts are compounds of Group IV transition metals of the Periodic Table such as titanium, zirconium, hafnium, etc., and have a coordinated structure with a metal compound and ligands composed of one or two groups of cyclopentadienyl (Cp), indenyl (IND), fluorenyl or their derivatives. Use of metallocene catalysts in the polymerization of olefins has various advantages. Metallocene catalysts have high activities and are capable of preparing polymers with enhanced physical properties in comparison with the polymers prepared using Ziegler-Natta catalysts. The key to metallocenes is the structure of the complex. The structure and geometry of the metallocene can be varied to adapt to the specific need of the producer depending on the desired polymer. Metallocenes comprise a single metal site, which allows for more control of branching and molecular weight distribution of the polymer. Monomers are inserted between the metal and the growing chain of polymer.

In a preferred embodiment, the metallocene catalyst has a general formula (I) or (II):

(Ar)$_2$MQ$_2$                   (I); or

R"(Ar)$_2$MQ$_2$                 (II)

wherein the metallocenes according to formula (I) are non-bridged metallocenes and the metallocenes according to formula (II) are bridged metallocenes;

wherein said metallocene according to formula (I) or (II) has two Ar bound to M which can be the same or different from each other;

wherein Ar is an aromatic ring, group or moiety and wherein each Ar is independently selected from the group consisting of cyclopentadienyl (Cp), indenyl (IND), tetrahydroindenyl (THI) or fluorenyl, wherein each of said groups may be optionally substituted with one or more substituents each independently selected from the group consisting of halogen, a hydrosilyl, a SiR$_3$ group wherein R is a hydrocarbyl having 1 to 20 carbon atoms, and a hydrocarbyl having 1 to 20 carbon atoms, and wherein said hydrocarbyl optionally contains one or more atoms selected from the group comprising B, Si, S, O, F, Cl and P;

wherein M is a transition metal selected from the group consisting of titanium, zirconium, hafnium and vanadium; and preferably is zirconium;

wherein each Q is independently selected from the group consisting of halogen; a hydrocarboxy having 1 to 20 carbon atoms; and a hydrocarbyl having 1 to 20 carbon atoms and wherein said hydrocarbyl optionally contains one or more atoms selected from the group comprising B, Si, S, O, F, Cl and P; and wherein R" is a divalent group or moiety bridging the two Ar groups and selected from the group consisting of a C$_1$-C$_{20}$ alkylene, a germanium, a silicon, a siloxane, an alkylphosphine and an amine, and wherein said R" is optionally substituted with one or more substituents each independently selected from the group consisting of halogen, a hydrosilyl, a SiR$_3$ group wherein R is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl and P.

The term "hydrocarbyl having 1 to 20 carbon atoms" as used herein is intended to refer to a moiety selected from the group comprising a linear or branched C$_1$-C$_{20}$ alkyl; C$_3$-C$_{20}$ cycloalkyl; C$_6$-C$_{20}$ aryl; C$_7$-C$_{20}$ alkylaryl and C$_7$-C$_{20}$ arylalkyl, or any combinations thereof. Exemplary hydrocarbyl groups are methyl, ethyl, propyl, butyl (Bu), amyl, isoamyl, hexyl, isobutyl, heptyl, octyl, nonyl, decyl, cetyl, 2-ethylhexyl, and phenyl. Exemplary halogen atoms include chlorine, bromine, fluorine and iodine and of these halogen atoms, fluorine and chlorine are preferred. Exemplary hydrocarboxy groups are methoxy, ethoxy, propoxy, butoxy (Bu), and amyloxy. Exemplary of the alkylene groups is methylidene, ethylidene and propylidene.

Illustrative examples of metallocene catalysts comprise but are not limited to bis(cyclopentadienyl)zirconium dichloride (Cp$_2$ZrCl$_2$), bis(cyclopentadienyl)titanium dichloride (Cp$_2$TiCl$_2$), bis(cyclopentadienyl)hafnium dichloride (Cp$_2$HfCl$_2$); bis(tetrahydroindenyl)zirconium dichloride, bis (indenyl)zirconium dichloride, and bis(n-butyl-cyclopentadienyl)zirconium dichloride; ethylenebis(4,5,6,7-tetrahydro-1-indenyl)zirconium dichloride, ethylenebis(1-indenyl) zirconium dichloride, dimethylsilylene bis(2-methyl-4-phenyl-inden-1-yl)zirconium dichloride, diphenylmethylene (cyclopentadienyl)(fluoren-9-yl)zirconium dichloride, and dimethylmethylene[1-(4-tert-butyl-2-methyl-cyclopentadienyl)](fluoren-9-yl)zirconium dichloride.

Generally, metallocene catalysts are provided on a solid support. The support should be an inert solid, which is chemically unreactive with any of the components of the conventional metallocene catalyst. The support is preferably a silica compound. In a preferred embodiment, the metallocene catalyst is provided on a solid support, preferably a silica support.

The term "chromium catalysts" refers to catalysts obtained by deposition of chromium oxide on a support, e.g. silica or aluminium support. Illustrative examples of chromium catalysts comprise but are not limited to CrSiO$_2$ or CrAl$_2$O$_3$.

The term "Ziegler-Natta catalysts" refers to catalysts preferably of the general formula MX$_n$, wherein M is a transition metal compound selected from group IV to VII, wherein X is a halogen, and wherein n is the valence of the metal. Preferably, M is a group IV, group V or group VI metal, more preferably titanium, chromium or vanadium and most preferably titanium. Preferably, X is chlorine or bromine, and most preferably, chlorine. Illustrative examples of the transition metal compounds comprise but are not limited to $TiCl_3$, $TiCl_4$.

By the term "production of polyethylene" or "ethylene polymerization" it is meant feeding to a reactor reactants including ethylene monomer, a diluent, a catalyst and optionally a co-monomer, an activating agent and a terminating agent such as hydrogen. A homo-polymer or co-polymer result.

The term "co-polymer" refers to a polymer, which is made by linking two different types of in the same polymer chain. The term "homo-polymer" refers to a polymer which is made by linking ethylene monomers, in the absence of co-monomers.

As used herein, the term "diluent" refers to diluents in liquid form that is in a liquid state, liquid at room temperature. Diluents which are suitable for being used in accordance with the present may comprise but are not limited to hydrocarbon diluents such as aliphatic, cycloaliphatic and aromatic hydrocarbon solvents, or halogenated versions of such solvents. The preferred solvents are C12 or lower, straight chain or branched chain, saturated hydrocarbons, C5 to C9 saturated alicyclic or aromatic hydrocarbons or C2 to C6 halogenated hydrocarbons. Nonlimiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment of the present invention, the diluent is isobutane. However, it should be clear from the present invention that other diluents may as well be applied according to the present invention.

The term "co-monomer" refers to olefin co-monomers which are suitable for being polymerized with ethylene monomers. Co-monomers may comprise but are not limited to aliphatic C3-C20 alpha-olefins. Examples of suitable aliphatic C3-C20 alpha-olefins include propylene, 1-butene, 4-methyl-1-pentene, 1-hexene, 1-octene, 1-decene, 1-dodecene, 1-tetradecene, 1-hexadecene, 1-octadecene and 1-eicosene.

The term "activating agent" refers to materials that can be used in conjunction with a catalyst in order to improve the activity of the catalyst during the polymerization reaction. In the present invention, it particularly refers to an organoaluminium compound, being optionally halogenated, having general formula $AlR^1R^2R^3$ or $AlR^1R^2Y$, wherein $R^1$, $R^2$, $R^3$ is an alkyl having from 1 to 6 carbon atoms and $R^1$, $R^2$, $R^3$ may be the same or different and wherein Y is hydrogen or a halogen.

In a first aspect, the invention provides a method for producing a catalyst slurry blend suitable for polymerizing ethylene in an ethylene polymerization loop reactor for obtaining a multimodal polyethylene product. Preferably, the invention provides a method for producing a catalyst slurry blend suitable for polymerizing ethylene in an ethylene polymerization loop reactor for obtaining an at least trimodal polyethylene product.

By the term "polyethylene with a bimodal molecular weight distribution" or "bimodal polyethylene" it is meant, polymers having two maxima in their molecular weight distribution curves. By the term "polyethylene with at least trimodal molecular weight distribution" or "at least trimodal" polyethylene it is meant polymers with at least three maxima in their molecular weight distribution curves. By the term "polyethylene with a multimodal molecular weight distribution" or "multimodal" polyethylene it is meant polymers with at least two, preferably above two maxima in their molecular weight distribution curves. Preferably, the polyethylene product is at least trimodal. For example, the polyethylene product can be polyethylene with a trimodal molecular weight distribution. Preferably the polyethylene product is polyethylene with a quadri-modal molecular weight distribution.

The method according to an embodiment of the invention comprises: transferring a first ethylene polymerization catalyst at a first mass flow rate to a mixing vessel. Simultaneously to the transfer of the first ethylene polymerization catalyst, a second ethylene polymerization catalyst is transferred at a second mass flow rate to the same mixing vessel. In an embodiment, the first ethylene polymerization catalyst is different from the second ethylene polymerization catalyst.

In an embodiment of the method according to the invention, the first and second ethylene polymerization catalyst are selected from a list consisting of a chromium catalyst, a Ziegler-Natta catalyst, a metallocene catalyst, a single site catalyst, a single site metallocene catalyst; and the first ethylene polymerization catalyst is different from the second ethylene polymerization catalyst.

In an embodiment of the method according to the invention, the first and second ethylene polymerization catalysts are free flowing catalysts, preferably single site catalysts, preferably single site metallocene catalysts. Examples of preferred metallocene catalyst blends are: $Et(THI)_2ZrCl_2$ with $Et(IND)_2ZrCl_2$, and $Et(THI)_2ZrCl_2$ with $(nBuCp)_2ZrCl_2$.

In a preferred embodiment of the method according to the invention, the first and/or second ethylene polymerization catalyst is a metallocene catalyst. Preferably, the metallocene catalyst is comprised in an organic diluent. Preferably the organic diluent is isobutane. Metallocene catalyst in isobutane diluent provides a slurry which is free flowing. It can be easily metered and dosed using a mass flow meter. Hence, a pre-determined amount of catalyst may be provided to a mixing vessel by means of a mass flow meter. A flow of material comprising a known mass of the first ethylene polymerization catalyst is send at a pre-determined rate to the mixing vessel.

The result of the above described method is an in situ preparation of a catalyst slurry blend.

By modifying the ratio of the first mass flow rate to the second mass flow rate, the concentration of catalysts transported in a stream of diluent to a mixing vessel, can be easily modified. Almost any blend of at least a first and second ethylene polymerization catalyst may be obtained in the mixing vessel.

Use of a mixing vessel allows a catalyst slurry blend to be prepared at a high concentration. This is advantageous for saving space and consequently keeping equipment investments for a polymer plant moderate. Use of a mixing vessel as intermediate between a mud pot, encompassing a first or second ethylene polymerization catalyst, and a polymerization reactor is advantageous for providing flexibility to the preparation of a catalyst slurry blend.

In an embodiment of the method according to the invention, the concentration is obtained by transferring to the mixing vessel a diluent. It can be diluted down to a desired concentration just prior to injection into a reactor. The concentration can easily be adjusted to the requirements of the polymerization reactor at any given time.

For obtaining the catalyst slurry blend at a concentration suitable for polymerizing ethylene, the above described first and second mass flow rates are adjusted and monitored. The mass flow rates may be influenced by adding or removing diluent from the catalyst slurry flows, hence decreasing or increasing the mass flow of catalyst comprised in a diluent stream travelling to the mixing vessel. In a preferred embodiment, a mass flow rate of the slurry is comprised between 50 and 260 kg per hour. In a preferred embodiment the ratio of the first catalyst to the second catalyst is between 30/70 to 70/30, preferably 50/50.

A suitable concentration for use in an ethylene polymerization reaction is preferably comprised between 0.1% and 10%, more preferably comprised between 0.5% and 5%, even more preferably between 1% and 3%, most preferably around 1.5%, expressed in total catalyst weight by volume of diluent. In a preferred embodiment, the catalyst slurry blend in the above described mixing vessel has a concentration, expressed as total catalyst weight by volume of diluent, of between 0.1% and 10% by weight. More preferably the slurry is diluted in a hydrocarbon diluent to a concentration comprised between 0.5 and 5%, preferably between 1 and 3%, more preferably around 1.5%. This concentration of catalyst slurry blend will enable use of membrane pumps for injecting catalyst slurry in the reactor.

In an embodiment of the method according to the invention, obtaining the above described concentration is controlled by at least two catalyst metering valves; whereby a first catalyst metering valve is provided in a conduit transferring the first ethylene polymerization catalyst to the mixing vessel and a second catalyst metering valve is provided in a conduit transferring the second ethylene polymerization catalyst to the mixing vessel.

In a preferred embodiment, the above mentioned metering valve is a ball check valve or shot feeder valve. FIG. 1 illustrates a ball check feeder valve arrangement suitable for utilization in the present apparatus. However, it is clear that other types of valves could be used as well in accordance to the present invention. Referring to FIG. 1, a preferred embodiment of a valve is represented which includes a body 16, having an inlet 17 and an outlet 18, a member 19, containing a metering chamber 20, which is rotatable within the body 16 for communicating with the inlet 17 and outlet 18 in at least two positions, a ball shaped piston 21, which moves with a reciprocating motion within the chamber 20 as the member 20 is rotated. The working mechanism of such valve involves a sequence of charging, valve actuation and dumping of a specific volume of catalyst slurry from a mud pot 2 to a mixing vessel 3. During operation, when the valve takes a first position, a fixed quantity of concentrated slurry flows through the inlet 17 and fills a chamber 20 within the valve 9. Said quantity is released to the mixing vessel 3 when the valve is actuated to a second position. The valve 9 thus delivers a fixed volume of concentrated slurry from mud pot 2.

More in detail the mechanism of action of this special ball check valve 9 is the following. The valve 9 is charged or filled with a predetermined volume of a mixture of catalyst and diluent when in a first position. Periodically this ball check valve is actuated to a second position and this volume of the mixture is dumped from the valve into the mixing vessel 3. The ball check valve 9 is then recharged or refilled with the predetermined volume of the mixture in preparation for actuation back to the first position where the second volume of mixture is dumped from the valve 9 into the mixing vessel 3. Concentrated slurry flow from mud pot 2 to the mixing vessel 3 is thus accomplished by the cyclic operation of the metering valve 9. The cycle time of the valves determines the catalyst flow rate to the mixing vessel 3. For instance, when this cycle time is increased, the flow rate of catalyst decreases.

In an embodiment of the invention, the method further comprises the steps of: decreasing the concentration of the first ethylene polymerization catalyst in the mixing vessel, transferring to the mixing vessel a third ethylene polymerization catalyst at a third mass flow rate, progressively replacing the first ethylene polymerization catalyst by the third ethylene polymerization catalyst, and increasing the concentration of the third ethylene polymerization catalyst in the mixing vessel.

This procedure is advantageous for feeding an ethylene polymerization reactor with different blends. Feeding of a blend to the reactor may proceed continuously. Reactor down-time is kept to a minimum.

The catalyst slurry blend is then fed to an ethylene polymerization loop reactor for producing multimodal polyethylene product. The present invention is particularly applicable to any ethylene polymerization reaction in a loop reactor. A so-called "loop reactor" is well known and is described in the Encyclopaedia of Chemical Technology, 3rd edition, vol. 16 page 390. Additional details regarding loop reactor apparatus and polymerization processes may be found in US 2009/0143546. A loop reactor consist of a long pipe, arranged in one or more, typically two loops, each loop being tens of meters high. The diameter of the pipes is typically around 60 cm. Such an arrangement has a large surface area:volume ratio as compared with a conventional flask or vessel arrangement. This ensures that there is sufficient surface area to the reaction vessel to allow heat exchange with the outer environment, thus reducing the temperature inside the reactor. This makes it particularly suitable for polymerization reactions which are exothermic and require extensive cooling. The configuration is also advantageous as it provides a lot of room for the installation of a cooling system, usually water jackets. This serves to efficiently carry away heat from the surface of the reactor, to increase the efficiency of cooling.

Loop reactors may be connected in parallel or in series. The present invention is particularly applicably to a pair of loop reactors connected in series. When the two reactors are connected in series, different reaction conditions can be used in the reactors allowing the production of several types of products using the same installation. Bimodal polymers may be produced by producing a high molecular weight polymer fraction in a first loop reactor and a low molecular weight polymer fraction in a second loop reactor. Multimodal polymers may be produced using a double loop reactor wherein in at least one loop reactor a bimodal polymer is produced.

In an embodiment of the method according to the invention, the ethylene polymerization loop reactor is a single loop reactor or a double loop reactor; and wherein said catalyst slurry blend is injected in said single or said first and/or second loop of said loop reactor.

In an embodiment of the method according to the invention, the concentration is fed to an ethylene polymerization reactor comprising a first loop reactor and a second loop reactor, whereby the first loop reactor is operated at different conditions of monomers and hydrogen compared to the second loop reactor.

In an embodiment of the method according to the invention, at least one loop reactor is fed with hydrogen.

In an embodiment of the method according to the invention, ethylene in the ethylene polymerization reactor is comprised between 3 to 15% by weight, and in the feed to the reactor a ratio for hydrogen feed to ethylene feed in the at least one loop reactor comprised between 10 and 350 ppm, expressed as volume H2 per weight of ethylene.

In an embodiment of the method according to the invention, an alpha-olefin co-monomer is fed to, the ethylene polymerization reactor; the co-monomer is selected a group consisting of 1-butene, 1-pentene, 1-hexene, 4-methyl-1-pentene, 1-heptene and 1-octene.

In an embodiment of the method according to the invention, the ethylene polymerization catalysts are transferred to the mixing vessel from a mud pot; the mud pot is maintained at a pressure higher than the pressure of the mixing vessel. Preferably the mud pot is maintained at a pressure between 4 and 16 barg, more preferably at a pressure between 7 and 11 berg, most preferably around 9 barg.

According to the invention, the catalyst blend is not constituted in the reactor by introducing catalysts directly from their mud pots to the reactor. The catalyst blend is prepared in a mixing vessel apparatus, which acts as a "buffer" between the mud pots encompassing the first and second catalyst and the reactor. The mixing vessel is operated at a pressure lower than the reactor pressure, thus eliminating the risk of uncontrolled high catalyst injection under high pressure to the reactor. Furthermore, such mixing vessel enables to dampen the discontinuous catalyst feed fluctuations to the reactor. Another advantage of providing a mixing vessel is that catalyst slurry blend can be further diluted to a concentration suitable for use in the polymerization reactor and that a slurry having a desired, substantially constant, concentration can be prepared.

It is important to correctly control the metallocene catalyst flow rate to the reactor and to pump catalyst slurry blend into the reactor at a controlled and limited flow rate. An unexpected flow rate to the reactor could lead to a runaway reaction. A fluctuating flow to the reactor could lead to reduced efficiency and fluctuations in product quality. Therefore, in a particularly preferred embodiment, the flow rate of catalyst slurry blend injected to the reactor is dictated by the reactor activity. In particular, the pumping means are controllable in function of the concentration of a reactant in said reactor. Preferably said reactant is the concentration of monomer, i.e. ethylene, in the reactor. In a preferred embodiment, the pumping means is providing a flow rate of the catalyst slurry blend that is matching the concentration of ethylene in the ethylene polymerization reactor. However, it should be clear that the pumping means are controllable in function of the concentration of other reactants, such as e.g. the co-monomer or hydrogen concentrations in the reactor as well.

Preferably the pumping means is a membrane pump. Membrane pumps are particularly suitable for adjusting catalyst flow rate to a suitable value which is in accordance with the polymerization reaction taking place in the reactor, since these pumps are controllable in function of the concentration of a reactant in said reactor.

By the use of membrane pumps the invention provides for a good control catalyst flow. In particular, the metallocene catalyst flow rate to the reactors is controlled by adjusting the stroke and/or frequency of the membrane pumps. Furthermore, the pump flow rates are controlled by the ethylene concentration in the reactor. In case the ethylene concentration is high in the reactor, more catalyst will be added to the reactor and vice versa. In this way, the variations in ethylene polymerization rate are taken into account and actual production rate and product properties do not fluctuate significantly. Variations in ethylene polymerization rate are taken into account and polymerization reactions under optimal catalyst feeding conditions can be obtained.

In an embodiment of the method according to the invention, the continuously feeding the catalyst slurry blend from the mixing vessel to the ethylene polymerization reactor is obtained by providing a pumping means in a conduit connecting the mixing vessel to the ethylene polymerization reactor; and the mixing vessel is maintained at a pressure between 2 barg and 16 barg, preferably between 3 barg and 7 barg, most preferably around 5 barg.

In an embodiment of the method according to the invention, an activating agent is added to the catalyst slurry blend by injecting the activating agent into a conduit transferring the catalyst slurry blend from the mixing tank to the ethylene polymerization reactor; the activating agent is an organoaluminium compound, being optionally halogenated, having general formula $AlR^1R^2R^3$ or $AlR^1R^2Y$, wherein $R^1, R^2, R^3$ is an alkyl having from 1 to 6 carbon atoms and $R^1, R^2, R^3$ may be the same or different and wherein Y is hydrogen or a halogen.

In a further embodiment, the present method further comprises bringing an activating agent into contact with said catalyst slurry before feeding said catalyst slurry to said reactor. A tri-isobutyl aluminium (TIBAL) is preferably used as activating agent.

The above aspects and embodiments are further supported by the following non-limiting examples.

EXAMPLES

Example 1

Figure 2:
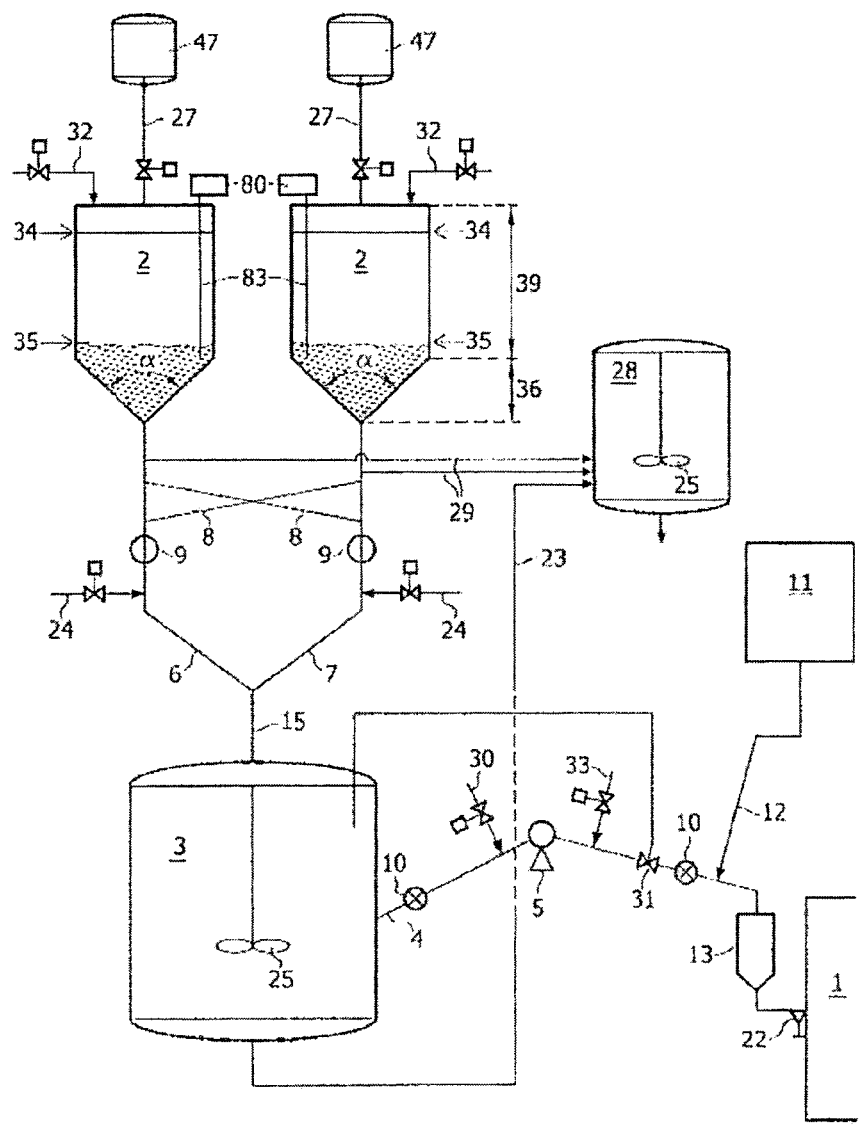
FIG. 2 schematically illustrates an embodiment of a catalyst slurry blend preparation system suitable for preparing catalyst slurry blends for the production of multi-modal polyethylenes.

This example describes the preparation of a catalyst slurry blend of metallocene catalysts and feeding this blend to an ethylene polymerization reactor for the production of a multimodal polyethylene. The method will be described using a device as illustrated by FIG. 2.

A metallocene catalyst is solid and is generally provided under a dry form in commercially available packaging. Depending on the diluent used, it may be required to bring the catalyst under higher pressure conditions in the container 47. This is for instance the case when isobutane is used, since this diluent is only liquid at higher pressure levels.

Preferably pressurizeable catalyst supply containers are used. Pressurizeable containers may be suitable for direct use and coupling to an inlet provided on the mud pot. Use of a larger size pressurizeable container for transportation and supply is therefore preferred. The pressurizeable catalyst supply vessel 47 is preferably suitable for handling pressure levels of between 1.1 and 16 barg, preferably around 10 barg. Purging in such catalyst supply vessel 47 is preferably performed by means of nitrogen and venting to a flare (not illustrated).

Pressurizeable containers may be suitable for direct use and coupling to an inlet provided on the mud pot 2. Preferably the catalyst supply vessel 47 is emptied using gravitational force. Catalyst from the catalyst supply vessel 47 is transferred by means of conduit 27 to a mud pot 2.

Preferably, a metallocene catalyst is provided directly from the container in which it was transported to a mud pot 2. Said catalyst supply vessel is a commercial container 47 that is suitable for handling higher pressure comprised between 1.1 barg and 16 barg, and preferably of 10 barg.

A first metallocene catalyst slurry is prepared in a first mud pot 2. A second metallocene catalyst slurry is prepared in a second mud pot 2. The catalyst slurries comprise solid catalyst in a hydrocarbon diluent. When using a metallocene catalyst, hydrocarbons such as hexane or isobutane can be used to dilute the catalyst and to obtain a catalyst slurry. However, a major disadvantage of using hexane as diluent to prepare the catalyst is that a portion of hexane generally ends up in the final polymer product, which is undesirable. Isobutane on the other hand is easier to handle, to purify and to re-use in the polymerization process than hexane. For instance, since in the polymerization process of ethylene, isobutane is applied as diluent in the reaction, isobutane used as diluent for the catalyst can easily be re-used in the polymerization process. Therefore, in a preferred embodiment, isobutane is used as diluent for the metallocene catalyst. In a particularly preferred embodiment, pure isobutane is used to prepare the catalyst. Isobutane is generally present in gaseous form at a temperature of about 20° C. and at atmospheric pressure. In other to obtain liquid isobutane for preparing the catalyst slurry, increased pressures need to be obtained. Therefore, the solid catalyst particles are provided to a mud pot 2, and later on to a mixing vessel 3, wherein an increased pressure, preferably comprised between 2 and 16 barg, and more preferably between 3 and 7 barg, and most preferably of 5 barg can be applied.

Still referring to FIG. 2, the transfer of metallocene catalyst from the catalyst supply vessel 47 to a mud pot 2 is preferably done by gravity. In a preferred embodiment, a bottom outlet opening is provided on said container which is suitable for connecting to the inlet opening on said mud pot and offloading said container by gravitational force.

Before transferring the metallocene catalyst from the catalyst supply vessel 47 to the mud pot 2, isobutane is admitted into the mud pot 2. The mud pot 2 is provided with an inlet 32 for supply of this diluent. The diluent is filled in the mud pot 2, and the catalyst supply vessel 47 is emptied. To avoid catalyst remains in the catalyst supply vessel 47, the vessel is flushed with isobutane, such that remaining catalyst is transferred to the mud pot 2. The mud pot 2 is not agitated by means of stirring or mixing means to allow the metallocene catalyst to settle.

The catalyst is preferably allowed to form a sediment in the mud pot. Preparing concentrated catalyst slurry in this way having these concentrations advantageously enables the use of small sized mud pots keeping investment expenditures limited.

This allows monitoring of the catalyst filling level in the mud pot by means of a reflectometer 80. After sedimented metallocene catalyst slurries have been prepared in the mud pots 2, the catalyst slurries are simultaneously transferred from the mud pots 2 to the mixing vessel 3. The transfer can take place manually or automatically. Preferably the transfer of catalyst slurries from the mud pots 2 to the mixing vessel 3 is performed by means of conduits 6, 7, 15 controlled by transfer means. Said transfer means preferably comprise a metering valve 9. Mixing vessel 3 is kept liquid-full. The mixing vessel is preferably provided with a stirrer 25.

The amount of catalyst slurry transferred from the mud pots to the mixing vessel is controlled by adjusting and monitoring the mass flow rate of the first catalyst slurry and of the second catalyst slurry. The first and/or second mass flow rate may be influenced by adding or decreasing of diluent. Not only the individual mass flow rates, but also the ratio of the mass flow rates may be adjusted and monitored, for obtaining a desired catalyst slurry blend in the mixing vessel 3. Preferably the first and second metallocene catalyst are transferred to mixing vessel 3 in a ratio 50/50 expressed in weight of the first metallocene catalyst to the second metallocene catalyst. A 50/50 blend is obtained in the mixing vessel 3.

The conduits 6, 7 are interconnected by means of connecting lines 8. Such lines 8 enable that the different mud pots 2 can be used in accordance with all provided conduits 6, 7. For instance, as represented in FIG. 2, in case two mud pots 2 are provided, each having a conduit 6 or 7, the conduit 6 for transferring said catalyst from a first mud pot 2 to a mixing vessel 3 is interchangeable with a second conduit 7 for transferring said catalyst from a second mud pot 2 to a mixing vessel 3 through lines 8 connecting said first 6 with said second 7 conduit. Such interconnection permits, in case of interruption of catalyst transfer through one conduit 6, to discharge the catalyst to the mixing vessel 13 through a second conduit 7.

The amount of diluent in the mud pot 2 may be substantially constant, i.e. above a certain level and between certain suitable ranges. The amount of diluent in the mud pot 2 is substantially constant between 40 and 100% of the vessel volume, and more preferred between 60 and 95%, and even more preferred between 80 and 90%.

The catalyst level in the mud pot 2 is determined by measuring the position of the level of diluent in the mud pot 2, for instance using a Time Domain Reflectometer 80 provided with guiding means 83. By means of this device the level of diluent 34 as well as the level of the interface formed between diluent and sedimented catalyst slurry 35 may be measured. Preferably the mud pot 2 has a cylindrical body 39 and a frustoconical bottom portion 36 with an opening angle α. This geometry is advantageous for enhancing the sedimentation of solid catalyst in the liquid diluent.

The mud pot 2 is preferably large enough to contain sufficient catalyst slurry and large enough such that a day vessel capacity is equivalent to the time to prepare a new batch. This enables to assure the continuous production and availability of the catalyst in the polymerization reaction. In addition, in another preferred embodiment, the pressure in the mud pot 2 is preferably maintained between 4 and 16 barg, preferably between 7 and 11 barg, and most preferably at 9 barg.

Each conduit 6, 7 is preferably equipped with metering valves 9 allowing the feeding of a controlled mass flow rate of catalyst to the mixing vessel 3. These valves are preferably provided downstream the connecting lines 8. The pressure difference between the mud pot 2 and the mixing vessel 3 supplies the motive force to feed the catalyst to the mixing vessel.

The metering valves 9 allow the transfer of a predetermined volume of catalyst to the mixing vessel 3. The catalyst slurry discharged by the valves is carried to the mixing vessel by an isobutane flow. Therefore, the conduits 6, 7, each are preferably further provided with a port 24, which can be connected for flushing with diluent. Said port is preferably provided downstream the valves 9.

Due to the degree of dilution and the use of membrane pumps the catalyst feeding system from the mud pot 2 to the mixing vessel 3 advantageously allows providing catalyst at a controlled flow rate to the mixing vessel 3. In addition, the feeding system permits to keep the concentration of catalyst slurry blend in the mixing vessel 3 at a substantially constant level, since catalyst flow regulated by the valve 9 to the mixing vessel 3 is dependent on the dosed amount (concentration) of catalyst and diluent in the mixing vessel 3. In a preferred embodiment of the invention the concentration of catalyst slurry blend in the mixing vessel is kept at a substantially constant level. Preferably the mixing vessel is kept liquid full. According to the invention the ratio between diluent and catalyst is adequately controlled. This is enabled by adequate control of catalyst feeding from the mud pot by means of the catalyst feeding system and metering valves 9, and by release of a suitable amount of isobutane to the mixing vessel.

Referring to FIG. 2, the metallocene catalyst slurry blend is subsequently transferred from the mixing vessel 3 to the ethylene polymerization reactor 1 through one or more conduits 4. The conduits 4 preferably have a diameter comprised between 0.3 and 2 cm, and preferably between 0.6 and 1 cm. Each conduit 4 is provided with a pumping means 5, which controls the transfer and injection of the catalyst slurry blend into the ethylene polymerization reactor 1. Preferably said pumping means are diaphragm pumps. Preferably, said reactor is a double loop reactor with two loop reactors are connected in series.

The mud pots 2 and the mixing vessel 3 can be emptied in a common or in separate dump vessels 28. Catalyst wastes can be sent through a conduit 29, 23, which is provided with a control valve, to one or more dump vessels 28. Preferably a dumping vessel 28 is provided with a stirrer 25. Preferably said dump vessel 28 are larger than the mud pot 2 and the mixing vessel 3. The dump vessel 28 is preferably a heated vessel, having a steam jacket, where the diluent, i.e. isobutane, is evaporated. The steam jacket is preferred, for desorbing isobutane from the solid catalyst. The evaporated diluent is sent to a distillation unit or to a flare. In order to avoid the transfer of catalyst fragments when transferring the evaporated diluent, guard filters are provided with the dump vessels. The dump vessels are also provided with pressure controlling means for controlling the pressure in said vessels. The catalyst waste remaining after evaporation of the diluent is removed from the vessels, preferably by means of a draining system, provided at the bottom of the vessel, and the removed waste is discharged into drums and destroyed. Metallocene catalysts are transferred from the mud pots 2 to the mixing vessel 3. The supply of diluent from conduit 24 to conduit 6 is decreased, thereby increasing the flow rates of metallocene catalyst to the mixing vessel 3.

The conduits 4 are further provided with isobutane flushing means, either at the inlet 30, at the outlet 33 or at both sides of the membrane pumps 5, as illustrated on FIG. 2. isobutane flushing means 30, 33 enable to flush isobutane through the conduit 4 and to keep the conduits 4 and the pumping means 5 unplugged. Preferably, there is continuous flushing of the conduit 4 downstream the membrane pump 5 to the reactor 1 by means of isobutane flushing means 33. The conduit 4 upstream the pump 5 may be flushed discontinuously, by means of isobutane flushing means 30. When different conduits 4 are provided for connecting the mixing vessel 3 to the reactor 1, generally, one conduit having one active pumping means 5 will be operative, while the other conduits 4 and pumping means 5 will not be operative but will be kept in stand by mode. In this latter case, the conduit 4 downstream the pump 5 will preferably be flushed with a suitable stream of diluent. The conduit 4 upstream the pump 5 may be discontinuously flushed. In addition, two-way valves 31 can be installed on the conduits 4, in order to never stop the pumping means 5.

It is important to correctly control the metallocene catalyst flow rate to the reactor and to pump catalyst slurry blend into the reactor at a controlled and limited flow rate. An unexpected flow rate to the reactor could lead to a runaway reaction. A fluctuating flow to the reactor could lead to reduced efficiency and fluctuations in product quality. Therefore, in a particularly preferred embodiment, the injection pump 5 flow rates are controlled by the reactor 1 activity.

The pumping means are in particular controllable in function of the concentration of a reactant in said reactor. Preferably said reactant is the concentration of monomer, i.e. ethylene, in the reactor. However, it should be clear that the membrane pumps are controllable in function of the concentration of other reactants, such as e.g. the co-monomer or hydrogen concentrations in the reactor as well. By the use of membrane pumps 5 the invention provides for a good control catalyst flow. In particular, the metallocene catalyst flow rate to the reactors is controlled by adjusting the stroke and/or frequency of the membrane pumps.

Furthermore, the pump flow rates are controlled by the ethylene concentration in the reactor. In case the ethylene concentration is high in the reactor, more catalyst will be added to the reactor and vice versa. In this way, the variations in ethylene polymerization rate are taken into account and actual production rate and product properties do not fluctuate significantly. Variations in ethylene polymerization rate are taken into account and polymerization reactions under optimal catalyst feeding conditions can be obtained.

The catalyst transition system may be further provided with a activating agent distribution system, for bringing a suitable amount of activating agent into contact with the catalyst slurry blend for a suitable period of time before supplying said catalyst slurry blend to said reactor. When using a metallocene catalyst, tri isobutyl aluminium (TIBAL) is preferably used as activating agent. When using a Ziegler-Natty catalyst, tri isobutyl aluminium (TIBAL) is preferably used as activating agent.

Activating agent wastes can be sent to a dump vessel 28, which is preferably provided with stirring means 25 and contains mineral oil for neutralization and elimination. The dump is provided with a heated vessel, e. g. steam jacket, where the isobutane is evaporated and sent to distillation or to the flare.

Activating agents are generally provided in commercial drums. In a mud pot of the activating agent distribution system 11, the TIBAL activating agent is generally provided in a solution of hexane or heptane, but can be provided in pure form too. The TIBAL activating agent is transferred from the mud pot through a activating agent injection conduit 12, in the conduit 4, which connects the mixing vessel 3 with the reactor 1. Conduit 12 intersects conduit 4, downstream the diaphragm pumps 5 and upstream the reactor 1. In case a flow measuring means 10 is further provided on the conduits 4, the activating agent feeding conduit 12 preferably intersects the conduit 4, downstream of said flow meter 10 and upstream the reactor 1.

In case the TIBAL activating agent is injected in the conduit 4, the injection point is at a distance from the reactor allowing a certain pre-contact time with the catalyst before being supplied to the reactor. In order to have a sufficient pre-contact time, preferably between 5 seconds and 1 minute, between the metallocene catalyst slurry blend and the TIBAL activating agent, each conduit 4 is provided with a contact vessel 13, preferably downstream the injection point of the activating agent distribution system, for enhancing the contact time of said activating agent with said catalyst slurry blend in the conduits 4. These contact vessels 13 can be agitated or not. In another preferred embodiment, the conduits 4 have an inner diameter comprised between 0.3 and 2 cm, and preferably comprised between 0.6 and 1 cm while the diameter of the contact vessels 13 is preferably comprised between 1 and 15 cm and preferably between 6 and 9 cm.

The catalyst slurry blend is injected under controlled flow rate into the reactor. The conduits 4 for transferring catalyst slurry blend into to the reactor are equipped by one or more valves, preferably piston valves 22. The piston valves 22 are capable of sealing the orifice by which the conduit 4 is connected to the reactor 1. When using different conduits 4 for transferring catalyst slurry blend to one reactor, only in one conduit 4 the pumps actively pump catalyst slurry blend to the reactor, while in other conduits 4 the pumps are not active and the conduits are preferably flushed by isobutane.

The catalyst slurry blend is injected into the reactor operating at the following conditions for obtaining a multi-modal polyethylene.

Example 2

A blend of 2 different catalysts was prepared as follow: A first ethylene polymerization catalyst (CATA A) was transferred at a first mass flow rate of 3.5 g/h to a mixing vessel, simultaneously a second ethylene polymerization catalyst (CATA B) different from the first one was transferred at a second mass flow rate of 6.5 g/h to said mixing vessel. The flow rates were monitored thereby obtaining a catalyst slurry blend at a concentration suitable for polymerizing ethylene. The activity of each catalyst was 5000 g/g. The catalyst slurry blend then fed to a polymerization double loop reactor, comprising a polymerization slurry of ethylene monomer, comonomer, and diluent. The productivity of the reaction was 50 kg/h of polyethylene, and a trimodal polyethylene was produced. For, comparison a monomodal polyethylene was produced separately using only catalyst A. A Bimodal polyethylene was produced separately using only catalyst B.

The characteristics of the trimodal polyethylene produced using the catalyst blend system are compared and summarized in Table 1, as well as those of polyethylene produced using only catalyst A and catalyst B.

TABLE 1

|  | bimodal | monomodal | trimodal |
|---|---|---|---|
| CATA A feed | 0% | 100% | 65% |
| CATA B feed | 100% | 0% | 35% |
| Density (g/cm3) | 0.935 | 0.928 | 0.926 |
| MI2 (dg/min) | 1.0 | 1.0 | 1.2 |
| HLMI (dg/min) | 39 | 29 | 50 |
| shear response (SR) | 39 | 29 | 41 |
| Mn (Da) | 23930 | 31510 | 25450 |
| Mw (Da) | 133960 | 88070 | 83135 |
| D (Mw/Mn) | 5.6 | 2.8 | 3.3 |
| D' (Mw/Mz) | 4.4 | 2.1 | 3 |

The invention claimed is:

1. Method for producing a catalyst slurry blend suitable for polymerizing ethylene in an ethylene polymerization loop reactor for obtaining an at least trimodal polyethylene product, comprising the steps of:
   transferring a first ethylene polymerization catalyst at a first mass flow rate to a mixing vessel,
   simultaneously transferring a second ethylene polymerization catalyst at a second mass flow rate to said mixing vessel, thereby in situ providing a catalyst slurry blend, wherein said second ethylene polymerization catalyst is different from the first ethylene polymerization catalyst,
   adjusting and monitoring said first and second mass flow rates, thereby obtaining said catalyst slurry blend at a concentration suitable for polymerizing ethylene, and
   feeding said catalyst slurry blend to an ethylene polymerization loop reactor producing said at least trimodal polyethylene product.

2. Method according to claim 1, wherein said ethylene polymerization loop reactor is a single loop reactor or a double loop reactor comprising a first loop and a second loop; and
   wherein said catalyst slurry blend is injected in said single loop reactor or said first and/or second loop of said double loop reactor.

3. Method according to claim 1, further comprising the steps:
   decreasing the concentration of said first ethylene polymerization catalyst in said mixing vessel,
   transferring to said mixing vessel a third ethylene polymerization catalyst at a third mass flow rate,
   progressively replacing said first ethylene polymerization catalyst by said third ethylene polymerization catalyst,
   increasing the concentration of said third ethylene polymerization catalyst in said mixing vessel.

4. Method according to claim 1, characterized in that, obtaining said concentration is controlled by at least two catalyst metering valves; whereby a first catalyst metering valve is provided in a conduit transferring said first ethylene polymerization catalyst to said mixing vessel and a second catalyst metering valve is provided in a conduit transferring said second ethylene polymerization catalyst to said mixing vessel.

5. Method according to claim 1, characterized in that, said ethylene polymerization catalysts are transferred to said mixing vessel from a mud pot; said mud pot is maintained at a pressure higher than the pressure of said mixing vessel.

6. Method according to claim 1, characterized in that, said concentration is obtained by transferring to said mixing vessel a diluent.

7. Method according to claim 1, characterized in that, said concentration is between 0.5 and 5%.

8. Method according to claim 1, characterized in that, said first and second ethylene polymerization catalyst are selected from a group consisting of a chromium catalyst, a Ziegler-Natta catalyst, a metallocene catalyst, a single site catalyst, a single site metallocene catalyst; and said first ethylene polymerization catalyst is different from said second ethylene polymerization catalyst.

9. Method according to claim 1, characterized in that, said first and second ethylene polymerization catalysts are single site catalysts.

10. Method according to claim 1, characterized in that, said concentration is fed to the ethylene polymerization loop reactor comprising a first loop reactor and a second loop reactor, whereby said first loop reactor is operated at different conditions of monomers and hydrogen compared to said second loop reactor.

11. Method according to claim 10, characterized in that, at least one loop reactor is fed with a hydrogen concentration.

12. Method according to claim 11, characterized in that, ethylene in said ethylene polymerization loop reactor is between 5 to 15% by weight, and a molar ratio of hydrogen to ethylene in said at least one loop reactor is comprised between 10 and 350 ppm expressed in hydrogen volume per ethylene weight.

13. Method according to claim 1, characterized in that, an alpha-olefin co-monomer is fed to said ethylene polymerization loop reactor; said co-monomer is selected a group consisting of 1-butene, 1-pentene, 1-hexene, 4-methyl-1-pentene, 1-heptene and 1-octene.

14. Method according to claim 1, characterized in that, said feeding said catalyst slurry blend from said mixing vessel to said ethylene polymerization loop reactor is obtained by providing a pumping means in a conduit connecting said mixing vessel to said ethylene polymerization loop reactor; and said mixing vessel is maintained at a pressure between 2 to 16 barg and said ethylene polymerization loop reactor is operated at a pressure above 38 barg.

15. Method according to claim 14, characterized in that, said pumping means is providing a flow rate of said catalyst slurry blend that is matching the concentration of ethylene in said ethylene polymerization loop reactor.

16. Method according to claim 1, characterized in that, an activating agent is added to said catalyst slurry blend by injecting said activating agent into a conduit transferring said catalyst slurry blend from said mixing tank to said ethylene polymerization loop reactor; said activating agent is an organoaluminium compound, being optionally halogenated, having general formula $AlR^1R^2R^3$ or $AlR^1R^2Y$, wherein $R^1$, $R^2$, $R^3$ is an alkyl having from 1 to 6 carbon atoms and $R^1$, $R^2$, $R^3$ may be the same or different and wherein Y is hydrogen or a halogen.

17. Method according to claim 1, characterized in that, said concentration is between 1 and 2%.

18. Method according to claim 1, characterized in that, said concentration is around 1.5%.

19. Method according to claim 1, characterized in that, said first and second ethylene polymerization catalysts are single site metallocene catalysts.

* * * * *